United States Patent
Paul et al.

(10) Patent No.: US 9,701,305 B2
(45) Date of Patent: Jul. 11, 2017

(54) AUTOMATIC VALET PARKING

(71) Applicant: GM Global Technology Operations LLC, Detroit, MI (US)

(72) Inventors: Brian D. Paul, Farmington Hills, MI (US); Walter M. Lazar, II, Howell, MI (US); Andrew Wassef, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/643,297

(22) Filed: Mar. 10, 2015

(65) Prior Publication Data

US 2016/0264132 A1 Sep. 15, 2016

(51) Int. Cl.
| | |
|---|---|
| *B60W 30/06* | (2006.01) |
| *B60W 10/04* | (2006.01) |
| *B60W 10/18* | (2012.01) |
| *B60W 10/20* | (2006.01) |
| *G05D 1/00* | (2006.01) |
| *B62D 15/00* | (2006.01) |
| *B62D 15/02* | (2006.01) |

(52) U.S. Cl.
CPC ............ *B60W 30/06* (2013.01); *B60W 10/04* (2013.01); *B60W 10/18* (2013.01); *B60W 10/20* (2013.01); *B62D 15/00* (2013.01); *B62D 15/0285* (2013.01); *B60W 2510/18* (2013.01); *B60W 2510/20* (2013.01); *B60W 2520/10* (2013.01); *B60W 2550/14* (2013.01); *B60W 2550/20* (2013.01)

(58) Field of Classification Search
CPC ...... B60W 10/04; B60W 10/18; B60W 10/20; B60W 30/06; B60W 2510/18; B60W 2510/20; B60W 2520/10; B60W 2550/14; B60W 2550/20; G05D 1/0088; B62D 15/00; B62D 15/0285
USPC .......................................................... 701/23
See application file for complete search history.

(56) References Cited

U.S. PATENT DOCUMENTS

| | | | | |
|---|---|---|---|---|
| 5,493,302 | A * | 2/1996 | Woll ................... | B60K 31/0008 342/109 |
| 8,392,118 | B2 * | 3/2013 | Korn ...................... | G01C 21/00 340/539.13 |
| 8,447,440 | B2 * | 5/2013 | Phillips ................ | G05D 1/0088 348/113 |
| 8,457,827 | B1 * | 6/2013 | Ferguson ................. | G05D 1/00 180/169 |
| 8,676,427 | B1 * | 3/2014 | Ferguson .............. | B60W 30/00 701/23 |
| 8,849,494 | B1 * | 9/2014 | Herbach ............... | B60W 30/00 701/24 |
| 8,954,235 | B2 * | 2/2015 | Lee ......................... | B62D 1/286 701/41 |
| 8,996,224 | B1 * | 3/2015 | Herbach .............. | G05D 1/0011 180/116 |
| 9,008,890 | B1 * | 4/2015 | Herbach ............... | B60W 30/00 340/435 |

(Continued)

*Primary Examiner* — Atul Trivedi
(74) *Attorney, Agent, or Firm* — Christopher DeVries; Reising Ethington P.C.

(57) ABSTRACT

A system and method of retrieving a vehicle includes generating a path from a final destination to a starting position, receiving a command to retrieve the vehicle, and autonomously operating the vehicle along the path from the final vehicle destination to the starting vehicle position.

20 Claims, 2 Drawing Sheets

(56) References Cited

U.S. PATENT DOCUMENTS

| | | | |
|---|---|---|---|
| 9,096,267 B2* | 8/2015 | Mudalige | B62D 15/025 |
| 9,298,186 B2* | 3/2016 | Harvey | B62D 15/0285 |
| 2002/0186144 A1* | 12/2002 | Meunier | G07B 15/00 |
| | | | 340/4.6 |
| 2008/0027591 A1* | 1/2008 | Lenser | G05D 1/0274 |
| | | | 701/2 |
| 2008/0162027 A1* | 7/2008 | Murphy | B60W 50/14 |
| | | | 701/117 |
| 2009/0276589 A1* | 11/2009 | Mylaraswamy | H04W 4/02 |
| | | | 711/162 |
| 2010/0063680 A1* | 3/2010 | Tolstedt | G05D 1/0214 |
| | | | 701/41 |
| 2010/0256836 A1* | 10/2010 | Mudalige | G08G 1/163 |
| | | | 701/2 |
| 2010/0318288 A1* | 12/2010 | Korn | G01C 21/00 |
| | | | 701/533 |
| 2013/0191003 A1* | 7/2013 | Hahne | B60W 50/14 |
| | | | 701/99 |
| 2014/0058587 A1* | 2/2014 | Leinfelder | B62D 15/0285 |
| | | | 701/2 |
| 2014/0058613 A1* | 2/2014 | Leinfelder | B62D 15/028 |
| | | | 701/28 |
| 2014/0067206 A1* | 3/2014 | Pflug | B60W 10/04 |
| | | | 701/41 |
| 2015/0039173 A1* | 2/2015 | Beaurepaire | B60W 30/06 |
| | | | 701/23 |
| 2015/0149022 A1* | 5/2015 | Harvey | E04H 6/422 |
| | | | 701/23 |
| 2015/0149265 A1* | 5/2015 | Huntzicker | B60W 30/06 |
| | | | 705/13 |
| 2015/0370255 A1* | 12/2015 | Harvey | B62D 15/0285 |
| | | | 701/24 |
| 2016/0052514 A1* | 2/2016 | Clarke | B60W 30/00 |
| | | | 701/28 |

* cited by examiner

AUTOMATIC VALET PARKING

TECHNICAL FIELD

The present invention relates to remote vehicle communications, and in particular, to autonomously retrieving a vehicle using a wireless device.

BACKGROUND

Modern vehicles are often equipped with hardware that enables a variety of wireless communications, including remote communications between the vehicle and a wireless device. This remote communication can be used to perform certain vehicle functions such as lock/unlock the doors, open/close the trunk, start the engine, and even locate the vehicle. Increasingly, vehicle manufacturers are also equipping vehicles with autonomous features wherein the vehicle communications system is able to sense its environment and operate the vehicle without, or with minimal, human involvement.

SUMMARY

According to an embodiment of the invention, there is provided a method of retrieving a vehicle using a wireless device. The steps include recording a path from a first position to a second position; generating a return path from the second position to the first position; receiving a retrieve command from the wireless device; and autonomously operating the vehicle along the return path from the second position to the first position.

According to another aspect of the invention, there is provided another method of retrieving a vehicle using a wireless device. The steps include establishing a starting position upon receiving a learn command; recording a path traveled by the vehicle from the starting position to a final destination; generating a return path from the final destination to the starting position; and autonomously operating the vehicle along the return path to the starting position upon receiving a retrieve command from the wireless device.

According to yet another aspect of the invention, there is provided a system for retrieving a vehicle using a wireless device. The system includes at least one vehicle system module and/or a vehicle telematics unit configured individually or in combination to establish a vehicle starting position upon receiving a learn command; record a path traveled by the vehicle from the starting position to a final destination; generate a return path from the final destination to the starting position upon receiving a stop command; and receive a retrieve command from the wireless device, and in response, initiate autonomous operation of the vehicle along the return path to the starting position.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below enable a user to autonomously retrieve a vehicle using a wireless device, such as a wireless mobile phone or keyfob. In one exemplary embodiment, this system and method can be used by a vehicle owner in lieu of a traditional valet parking service wherein the vehicle is given to a valet, parked, and then retrieved by the valet upon request by the vehicle owner. However, the disclosed system and method are also applicable to any situation in which a vehicle owner would like to autonomously retrieve the vehicle, such as parking at the grocery store, a mall, an apartment complex, or an airport, to name a few.

In one implementation, the user initiates a "learn" function that designates a starting position from which the vehicle begins to collect and record data relating to the vehicle path taken from the starting position to a final destination. Having learned the path from the starting position to the final destination, the vehicle communications system is able to map a return path back to the starting position. The user can subsequently retrieve the vehicle by initiating a "call" or "retrieve" command from the wireless device. The command is received by the vehicle communications system, and in response, directs the vehicle to autonomously follow the return path to the starting position.

Figure 1:
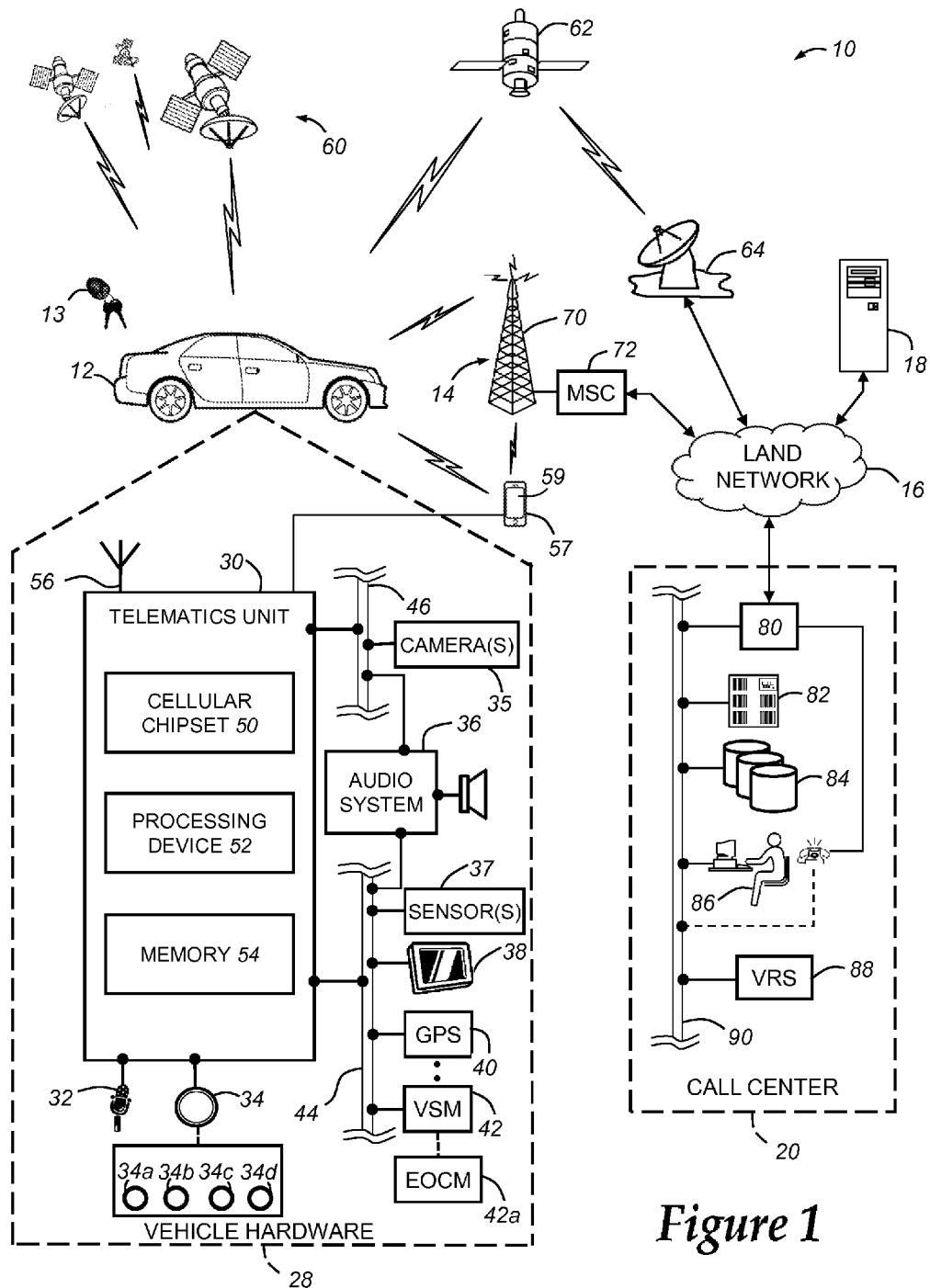
FIG. 1 is a block diagram depicting an embodiment of a communications system that is capable of utilizing the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including trucks, sports utility vehicles (SUVs), recreational vehicles (RVs), marine vessels, aircraft, etc., can also be used. The vehicle 12 includes an electronic vehicle key or keyfob 13 and may include pushbutton keyless-start technology (e.g., rather than requiring insertion of the key into a switch). In the illustrated embodiment, keyfob 13 includes a remote transmitter which communicates with a base unit installed in the vehicle 12 to provide the vehicle operator with localized wireless access to various vehicle systems and functions such as locking and unlocking doors, arming and disarming of a vehicle alarm system, trunk release, and panic signaling. The keyfob may include buttons for these various features so that, for example, by depressing the panic button on the keyfob, the transmitter signals the vehicle to sound a high decibel alarm that can be heard for some distance. As used herein, the term "keyfob" refers to any portable vehicle access device that enables access to the vehicle interior, vehicle engine operation, or both. The term "keyfob" includes both passive and active transmitters that can be attached to a key or set of keys by a loop or tether, as well as other portable remote transmitters regardless of whether they are attached to keys, as well as remote transmitters that are integrated together with a vehicle key or other device as a single component. The keyfob and its associated base unit on the vehicle may be conventional components that are well known to those skilled in the art.

Some of the vehicle electronics 28 are shown generally in FIG. 1 and include a telematics unit 30, a microphone 32, one or more pushbuttons or other control inputs 34, an audio system 36, a visual display 38, a GPS module 40, and a plurality of vehicle system modules (VSMs) 42. Some of these devices can be connected directly to the telematics unit 30 such as, for example, the microphone 32 and pushbutton (s) 34, while others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle 12 to communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle 12 to offer a number of different services including those related to navigation, telephony, emergency assistance, diagnostics, infotainment, etc. Data can be sent either via a data connection, such as packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to any suitable wireless communication platform, such as GSM, CDMA, or LTE and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software stored in the telematics unit 30 and executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit 30 can be configured with a static IP address or can be set up to automatically receive an assigned IP address from another device on the network such as a router or from a network address server.

One of the networked devices that can communicate with the telematics unit 30 is a wireless mobile device, such as a smart phone 57. Examples of the smart phone 57 include the iPhone™ manufactured by Apple, Inc. and the Droid™ manufactured by Motorola, Inc. but others are known. These and other similar devices may be used or considered as a type of separate wireless device for the purposes of the method described herein. While the smart phone 57 is described with the methods below, it should be appreciated that other similar and/or simpler handheld wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

The smart phone 57 can include computer processing capability, a transceiver capable of communicating using a short-range wireless protocol, and a visual smart phone display 59. The smart phone display 59 may also include a touch-screen graphical user interface and/or a GPS module capable of receiving GPS satellite signals and generating GPS coordinates based on those signals. In some embodiments, the smart phone 57 can include a downloadable software application (or "app") that can be used to communicate with the vehicle, and in particular, with telematics unit 30. The app provides an interface to the vehicle and may also include navigation features and other additional vehicle services (e.g., vehicle location reporting and vehicle stopping/slowdown control). Smart phone 57 can be carried or operated by any one of a number of individuals. These individuals can include vehicle owners, vehicle occupants, wireless mobile device owners, wireless mobile device users, or others. These users will be interchangeably described in the following descriptions.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module; diagnostic reporting using one or more diagnostic modules; and infotainment-related services where music, webpages, movies, television programs, videogames and/or other information is downloaded by an infotainment module (not shown) and is stored for current or later playback. Vehicle control such as speed control, slowdown, and vehicle ignition enabling and disabling may also be controlled via the telematics unit 30 to provide remote control over vehicle operation. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. VSMs 42 may also be integrated within telematics unit 30. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. Yet another example of a VSM 42 can be a sensor collecting module, and more particularly, an external object calculation module (EOCM) 42*a* configured to collect data from various vehicle sensors. The vehicle sensors may include, but are not limited to, short range ultrasonic radars, long range ultrasonic radars, and vehicle cameras. The sensor collecting module may also collect data from other vehicle sensors configured to measure time, distance traveled, and steering wheel angle. As is appreciated by those skilled in the art, the above-mentioned VSMs are only examples of some of the modules that may be used in vehicle 12, as numerous others are also possible.

Vehicle electronics 28 also include a number of vehicle user interfaces that provide vehicle occupants with a means of providing and/or receiving information, including microphone 32, pushbuttons(s) 34, camera(s) 35, audio system 36, sensors 37, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allows manual user input into the telematics unit 30 to initiate wireless telephone calls and provide other data, response, or control input. For example, in one embodiment pushbuttons 34 include a learn pushbutton 34*a*, a reset pushbutton 34*b*, a stop pushbutton 34*c*, and an alternate route pushbutton 34*d*. The learn pushbutton 34*a* is used to enable a learning mode wherein the EOCM 42*a* collects and records data relating to a vehicle driving path from a starting position to a final destination. The reset pushbutton 34*b* is used to restart the collecting and recording process to essentially restart the learn mode. The stop pushbutton 34*c* is used to disable the learning mode indicating that the vehicle 12 has arrived at the final destination, and the alternate route pushbutton 34*d* is used to initiate a request to modify an existing return path from the final destination to the starting position. Although shown in FIG. 1 as discrete manual pushbuttons, the different pushbuttons 34*a*-34*d* could also be implemented in other ways, such as menu items displayed on a touch-screen such as visual display 38 and be presented in response to a user command to execute the automatic valet process.

Camera(s) 35 provides a visual of the area surrounding the vehicle. Generally, one or more cameras are mounted to the front and rear of the vehicle to monitor forward and reverse vehicle trajectories, respectively. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD, and other multimedia functionality. This functionality can be provided in conjunction with or independent of the infotainment module described above. Sensors 37 generally include, but are not limited to, short and long range ultrasonic sensors configured to utilize radio waves and determine the range, direction, or speed of external objects. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
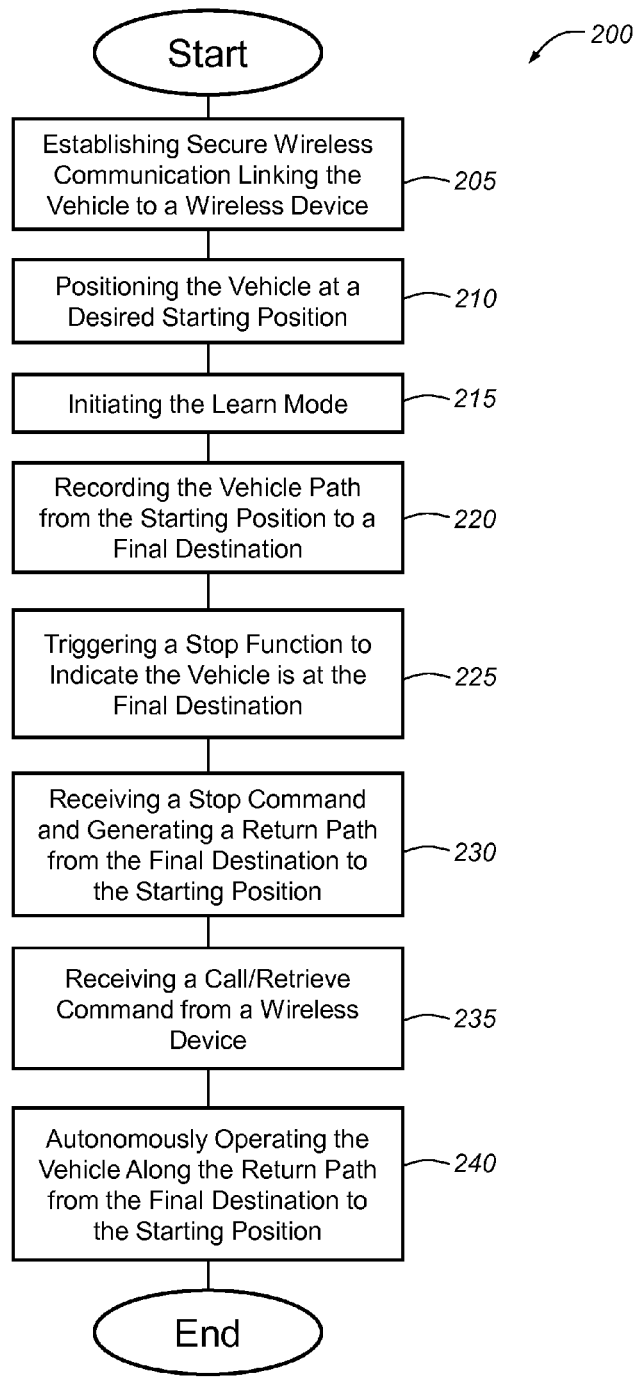
FIG. 2 is a flow chart of a method for retrieving a vehicle.

Turning now to FIG. 2, there is a method 200 for retrieving a vehicle using a wireless device. The method 200 is generally implemented by various combinations of the vehicle hardware 28 shown in FIG. 1. For example, in one embodiment, the telematics unit 30 may be configured to wholly implement the steps of method 200, while in other embodiments; the steps of method 200 are implemented using a combination of telematics unit 30 and other vehicle components such as the VSMs 42.

The method 200 begins at step 205 with establishing secure short-range wireless communication between the telematics unit 30 and one or more nearby wireless mobile devices, thereby linking the wireless device with the vehicle 12. The telematics unit 30 and wireless device can communicate with each other via any suitable short-range wireless communication technology using a standardized protocol, such as Bluetooth or others, some of which have been listed above. In operation, the telematics unit 30 can broadcast a low-power signal that alerts wireless devices within proximity of the vehicle 12 that it is able to establish a wireless connection. If a device is nearby, such as smart phone 57, the telematics unit 30 can provide the smart phone 57 with a wireless address of the telematics unit 30 and can receive in response a wireless address of the smart phone 57. For example, this can take place when a vehicle owner enters the vehicle 12 while carrying the smart phone 57. In this instance, the telematics unit 30 can be in a standby mode and begin searching for the smart phone 57 after a door of the vehicle 12 is opened. The telematics unit 30 can also search for wireless mobile devices when the vehicle ignition is turned on. Once both the telematics unit 30 and the smart phone 57 can identify each other, a secure wireless connection between them can be established over which the telematics unit 30 and the smart phone 57 can send and receive data. This linking or pairing of the smart phone 57 with the telematics unit 30 can be implemented such that it initially requires operator authorization, after which the pairing can be carried out automatically without user involvement. In one embodiment, the telematics unit 30 may also be linked or paired to a software application ("app") installed on the smart phone 57. After an initial linking or pairing to the telematics unit 30, the app on the smart phone 57 may automatically communicate with the telematics unit 30 through any suitable wireless communications technology as set forth above, or there may be an authentication mechanism such as requiring a password or other identifying information prior to connection with the telematics unit 30. While the step of establishing secure short-range wireless communication between the telematics unit 30 and one or more nearby wireless mobile devices is presented here at the beginning of the disclosed method, the connection between the wireless device and the vehicle may be established at any time prior to requesting to retrieve the vehicle 12 at step 235.

At step 210, the vehicle owner positions the vehicle 12 in front of a desired starting position. The starting position is the position to which the vehicle owner would like the vehicle 12 retrieved. The starting position can be any position designated by the vehicle owner. Some examples include a store front, the entrance to a mall or shopping center, a restaurant entrance, the front of a house, an airport arrival gate, etc.

At step 215, while the vehicle 12 is at the starting position, the vehicle owner initiates a "learn" mode by pressing a learn pushbutton 34a located in the vehicle cockpit. Alternatively, the learn mode may be initiated by pressing a learn button on a touch screen on the instrument panel of the visual display 38, or by using a voice command through microphone 32. The learn mode can be initiated while the vehicle is stopped at the starting position or as the vehicle 12 is passing the starting position.

At step 220, the vehicle hardware 28 receives a learn command and begins to record the path taken by the vehicle 12 from the starting position to a final destination, which in one non-limiting example may be a stall in a parking lot. Recording the path from the starting position to the final destination includes collecting data from various vehicle hardware 28 including, for example, front and rear cameras 35, short and long range ultrasonic sensors 37, GPS module 40, and data from other vehicle system modules such as those that provide timing, steering, and directional information. The collected data may also include information such as how many turns were made, the angles of the turns, how many feet were driven between turns, the time driven, etc. If available, the GPS data may include the location of lanes and/or parking locations.

A feature that may be used to alter the driving path prior to reaching the final destination is the "reset" function. The reset function restarts the recording process as if the vehicle is passing by the starting position for the first time. The reset function can be initiated by the vehicle owner via a reset pushbutton 34b located in the vehicle cockpit; by pressing a reset button on a touch screen on the instrument panel of the visual display 38; or by using a voice command through microphone 32. In addition, the reset function may be initiated automatically when the vehicle 12 passes the starting position prior to reaching the final destination. In other words, if the vehicle owner is driving around a parking lot looking for a parking spot and passes the starting position where the learn function was initiated (e.g. the store front), the reset function can be manually or automatically triggered such that all of the previous data regarding the path driven up to that point is discarded and the learn mode starts over recording new data from the starting position.

At step 225, a stop function is triggered indicating that the vehicle has arrived at the final destination. In most cases, the stop function is likely to be a parking stall, but could be any place from which the vehicle owner would like the vehicle retrieved. The stop function may be triggered by the vehicle owner pressing a stop button 34c located in the vehicle cockpit. Alternatively, the stop function may be triggered by pressing a stop button on the instrument panel touch screen, or by using a voice command through microphone 32. In another embodiment, the stop function may be triggered by the vehicle 12 being shifted into park.

At step 230, the vehicle hardware receives a stop command and generates a return path based on the data recorded during the learn mode. The return path identifies a route from the final destination back to the starting position. The vehicle hardware may also generate a map illustrating the return path. In one embodiment the map is rudimentary and contains primarily vectors. If the vehicle 12 is equipped with a display 38 that illustrates a GPS map of the vehicle's location, such as a parking lot, the map of the return path can be laid on top of the GPS map. The map may also be automatically displayed when the vehicle 12 is shifted into park. In addition, the map may be viewed at any time through the app on the smart phone 57 or other wireless device.

The vehicle owner may alter and optimize the return path on the vehicle display 38 via the telematics unit 30 before exiting the vehicle 12, or anytime while the vehicle is parked through the app on the wireless mobile device 57. In one example, the telematics unit 30 sends a communication to the EOCM 42a to use the altered route when returning the vehicle 12 to the vehicle owner. Altering the return path may be desirable if the path taken from the starting position to the final destination contained unnecessary turns or driving time. For example, in looking for an open parking stall the vehicle owner may have circled the parking lot several times before finding a suitable parking spot. In this case, following the original recorded path would not be the most efficient or quickest return path. Altering the return path can be accomplished via the touch screen on the vehicle display 38 by the vehicle owner selecting one or more points along the route and dragging those points to designate a new route. Alternatively, the vehicle owner may prompt the telematics unit 30 to suggest a new route by initiating an alternate route feature using an alternate route pushbutton 34d located on the touch screen on the vehicle display 38. Similar features for modifying the return path may be implemented though the app on the smart phone 57 or other wireless device.

At step 235, while at the starting position, the vehicle owner retrieves the vehicle 12 by initiating a "call" or "retrieve" command through the app on the wireless mobile device 57. Alternatively, the call command may be initiated via a keyfob. The retrieve command may be received via any suitable means including short-range wireless communications or via the wireless carrier system 14.

At step 240, the vehicle hardware 28 receives the call command to retrieve the vehicle 12 and begins remote operation of the vehicle 12 along the return path to the starting position. The vehicle hardware 28 utilizes the vehicle's 12 sensory capabilities such as the cameras 35 and sensors 37 to detect obstacles in the return path. To the extent the vehicle 12 encounters an obstacle in the return path, such as a pedestrian; the telematics unit 30 stops the vehicle until the obstacle has cleared the path. The speed of the vehicle on the return path is generally the same as the speed of the vehicle that was recorded during the learn mode; however, the speed is generally limited to 15 mph.

To interrupt the automatic retrieval of the vehicle 12, the vehicle owner can stop or temporarily pause the vehicle 12 using the app on the wireless mobile device 57. Alternatively, if close enough to the vehicle, the vehicle owner can disable the autonomous retrieval of the vehicle by pressing a button on the keyfob, or by physically actuating the door handle of the vehicle 12.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of retrieving a vehicle using a wireless device, the method comprising the steps of:
    recording, using a device installed in the vehicle, a vehicle path from a first position to a second position;
    generating a return path from the second position to the first position;
    receiving a retrieve command from the wireless device; and
    autonomously operating the vehicle along the return path from the second position to the first position in response to receiving the retrieve command.

2. The method of claim 1, wherein recording the vehicle path from the first position to the second position includes collecting vehicle data from at least one of: cameras, sensors, and a GPS module.

3. The method of claim 2, wherein the vehicle data includes at least one of the following: a number of turns made by the vehicle, turn angles, distance traveled, and vehicle direction.

4. The method of claim 1, further including the step of generating a map of the return path.

5. The method of claim 1, wherein the wireless device is a keyfob.

6. The method of claim 1, wherein the receive step further includes receiving a retrieve command sent using a software application on the wireless device.

7. The method of claim 1, further including monitoring the autonomous operation of the vehicle along the return path for obstacles and pausing the autonomous operation of the vehicle until a detected obstacle has cleared the path.

8. A method of retrieving a vehicle using a wireless device, the method comprising the steps of:
    establishing a vehicle starting position upon receiving a learn command;
    recording, using a device installed in the vehicle, a path traveled by the vehicle from the starting position to a final destination;
    generating a return path from the final destination to the starting position upon receiving a stop command; and
    autonomously operating the vehicle along the return path to the starting position upon receiving a retrieve command from the wireless device.

9. The method of claim 8, further including receiving the learn command from a button located inside the vehicle or by a voice command to a user interface in the vehicle.

10. The method of claim 8, further including receiving the retrieve command from the wireless device via short-range wireless communication or via a wireless carrier system.

11. The method of claim 8, wherein recording the path from the starting position to the final destination includes collecting vehicle data from at least one of: cameras, sensors, and a GPS module.

12. The method of claim 11, wherein the vehicle data includes at least one of the following: a number of turns made by the vehicle, turn angles, distance traveled, and vehicle direction.

13. The method of claim 8, further including generating a map of the return path.

14. The method of claim 8, further including monitoring the autonomous operation of the vehicle along the return path for obstacles and pausing the autonomous operation of the vehicle until a detected obstacle has cleared the path.

15. The method of claim 8, further including resetting the starting position automatically if after establishing the starting position the vehicle subsequently passes the starting position, or manually upon receiving a reset command.

16. The method of claim 8, further including generating an alternative route for the return path upon receiving an alternative route request.

17. A system for retrieving a vehicle using a wireless device, the system comprising:
    at least one vehicle system module and/or a vehicle telematics unit installed in the vehicle and configured individually or in combination to:
        establish a vehicle starting position upon receiving a learn command;
        record a path traveled by the vehicle from the starting position to a final destination;
        generate a return path from the final destination to the starting position upon receiving a stop command; and
        receive a retrieve command from the wireless device, and in response, initiate autonomous operation of the vehicle along the return path to the starting position.

18. The system of claim 17, wherein recording the path from the starting position to the final destination includes collecting vehicle data from at least one of: cameras, sensors, and a GPS module, and wherein the vehicle data includes at least one of the following: a number of turns made by the vehicle, turn angles, distance traveled, and vehicle direction.

19. The system of claim 17, wherein the retrieve command from the wireless device is received via short-range wireless communication or via a wireless carrier system.

20. The system of claim 17, wherein the autonomous operation of the vehicle along the return path is monitored for obstacles and paused until a detected obstacle has cleared the path.

* * * * *